United States Patent [19]

Danen

[11] Patent Number: 5,801,357
[45] Date of Patent: Sep. 1, 1998

[54] ELECTRIC BARBECUE WITH ROTISSERIE

[75] Inventor: Marc Danen, Albens, France

[73] Assignee: SEB S.A., Ecully Cedex, France

[21] Appl. No.: 758,368

[22] Filed: Nov. 29, 1996

[30] Foreign Application Priority Data

Nov. 28, 1995 [FR] France ................... 95 14091

[51] Int. Cl.$^6$ .............. A47J 37/07; A47J 37/04; F24L 7/06; H05B 3/06
[52] U.S. Cl. .............. 219/403; 219/404; 219/386; 99/421 H; 126/25 AA
[58] Field of Search .............. 219/385, 386, 219/388, 403, 404, 521; 99/419, 421 H, 421 R; 126/25 AA, 25 R, 9 B, 9 R

[56] References Cited

U.S. PATENT DOCUMENTS

| | | |
|---|---|---|
| 4,663,517 | 5/1987 | Huff et al. ................... 219/404 |
| 4,770,091 | 9/1988 | Vaughn . |
| 5,140,896 | 8/1992 | Duran . |

FOREIGN PATENT DOCUMENTS

| | | | |
|---|---|---|---|
| 1462088 | 12/1966 | France ................... 219/404 |
| 2 299 785 | 8/1976 | France . |
| 30 00 653 | 7/1981 | Germany . |
| 1522639 | 8/1978 | United Kingdom . |
| 2 083 343 | 3/1982 | United Kingdom . |

*Primary Examiner*—Teresa J. Walberg
*Assistant Examiner*—J. Pelham
*Attorney, Agent, or Firm*—Young & Thompson

[57] ABSTRACT

An electric barbecue with rotisserie comprises a frame, a kettle placed on the frame, a resistive electric heater element and a rotary spit. A motor driving the spit is housed in a unit fixed to the frame. A drive arrangement connects the motor to the spit. The unit includes electrical connections to supply power to the element. A single cable is connected to an external power supply to supply power to the connection system and the motor.

10 Claims, 5 Drawing Sheets

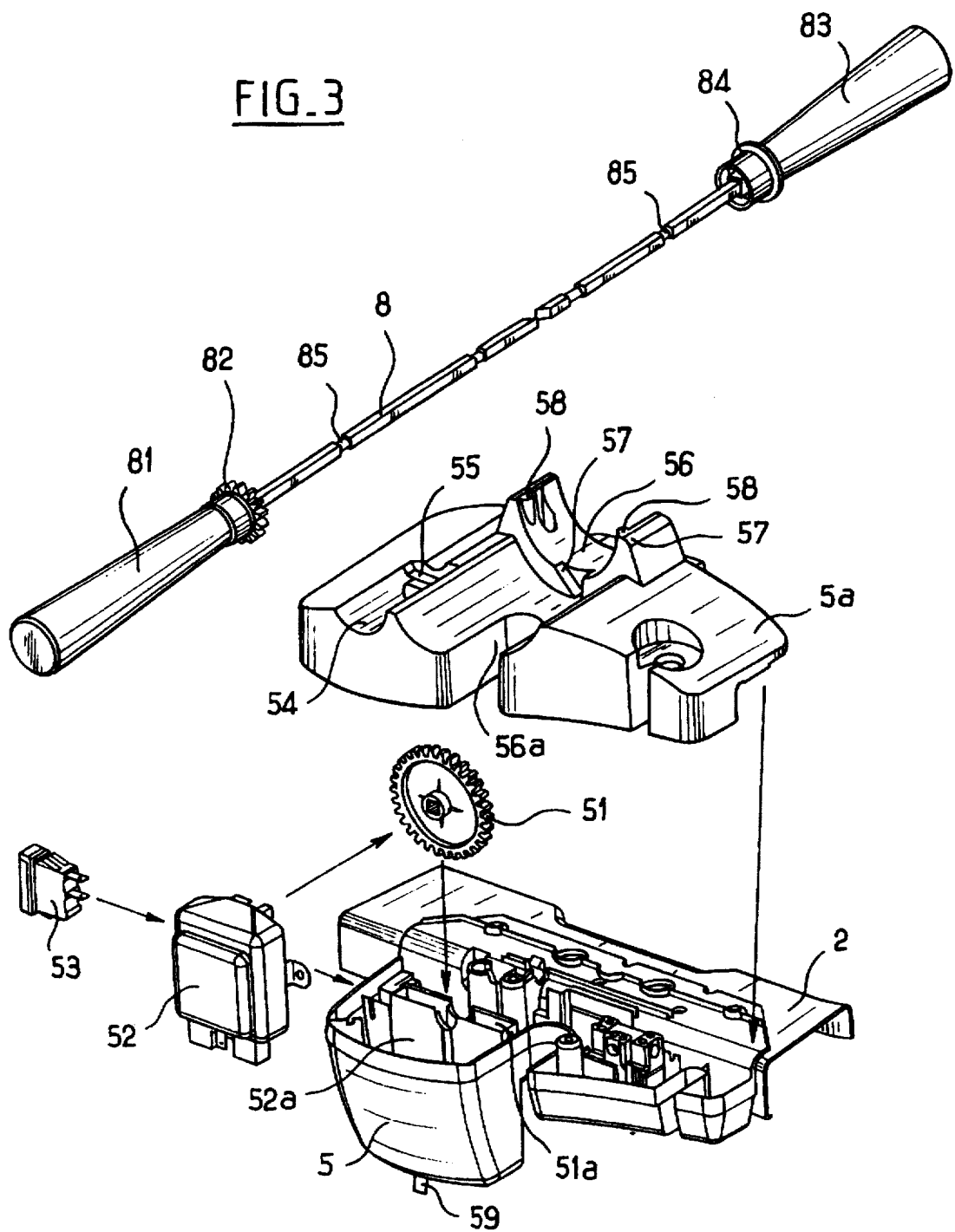
FIG_3

1

ELECTRIC BARBECUE WITH ROTISSERIE

BACKGROUND OF THE INVENTION

1. Field of the Invention

The present invention concerns an electric barbecue with a rotisserie.

2. Description of the Prior Art

Many barbecues are equipped with spit turners that rotate the food near a heater element during cooking.

The spit usually has a fixed handle at one end coupled to a fixed or removable electric motor.

Moving the spit is difficult because of the additional weight of the motor at one end and introduces the risk of burns or of dropping the cooked food. It is not infrequent for the motor to be damaged or mislaid if it is removable.

Electric barbecues have a power supply for the resistive electric element type heating means. This element is generally within a kettle, under a cooking grill.

The combination of the kettle, the grill and the element can in some cases pivot on the frame between a horizontal position and a vertical position.

Using the rotisserie with the element in the horizontal position generates excessive smoke due to carbonization of grease falling onto the heater element and using it with the element in the vertical position prevents simultaneous use of the grill and recovery of debris and cooking juices in the kettle.

Document DE 30 00 653 describes an electric barbecue with rotisserie in which the heater means and the spit are electrically connected to a common unit attached to the barbecue frame. However, the heater elements and the connection unit are not removable, which makes it difficult to clean the frame and the kettle of the barbecue. This aspect is particularly important when cooking food on the spit, when there is considerable splashing of grease and juice onto the walls of the kettle and the frame.

An aim of the present invention is to resolve the aforementioned disadvantages by proposing a barbecue that is simpler to use and that offers better user protection.

SUMMARY OF THE INVENTION

The invention consists in an electric barbecue with rotisserie comprising a frame, a kettle placed on the frame, electric heater means, at least one spit rotated by an electric motor housed in a unit fixed to said frame and further comprising electric connection means adapted to supply electric power to said electric heater means, and a single power supply cable adapted to be connected to an external electric power supply and to supply power to said connection means and said motor, wherein said unit comprises on a top face a recessed portion adapted to accommodate removably a part of a handle fixed to one end of said spit, said recessed portion having an opening through it in line with drive means housed in said unit and said handle of said spit incorporating complementary drive means adapted to be inter-engaged with said drive means when said handle is housed in said recessed portion, and wherein said unit comprises on said top face a housing adapted to receive removably a connection end of said electric heater means.

Fitting the heater means and the spit is thus facilitated by the housings provided on the top face of the unit. The user can easily fit or remove the heater means, in particular when cleaning the kettle or the grill.

Positioning the spit on the barbecue is also facilitated by the recessed part provided on the top of the unit. Thanks to the complementary drive means carried by the unit and the spit, inter-engagement of the motor and the spit does not require any manipulation other than that of placing the spit on the recessed part with the drive means meshing through the opening in the unit.

This produces an electric barbecue with removable spit and heater means that can easily be removed and replaced, which facilitates cleaning the kettle.

Additionally, this implementation also enables a connection unit to be designed that forms an integral unit removable from the frame to which it is fixed.

The electrical components required for operation of the barbecue can be insulated and separated from the frame and the kettle when cleaning the barbecue.

In a preferred version of the invention, the electric connection means project from a bottom face of said unit and an electric cable is adapted to connect the connection end to the connection means.

The electrical cable connecting the heater means to the unit is protected from soiling and splashing of liquids by being disposed under the unit.

In one advantageous version of the invention, the frame includes a removable support projecting above the frame, one edge of the kettle resting on the support, the hater means resting on the frame and the unit and the spit resting on the unit and the kettle.

In this way the kettle can be inclined on the frame independently of the heater means or the spit. It can therefore be used as a windshield during cooking of food outdoors and debris and cooking juice can be recovered in the kettle.

Other features and advantages of the invention will emerge further from the following description.

BRIEF DESCRIPTION OF THE DRAWINGS

In the accompanying drawings, which are given by way of non-limiting example:

FIG. 3 is an exploded perspective view showing the operating principle of the rotisserie of the electric barbecue.

DETAILED DESCRIPTION OF THE PREFERRED EMBODIMENTS

Figure 1:
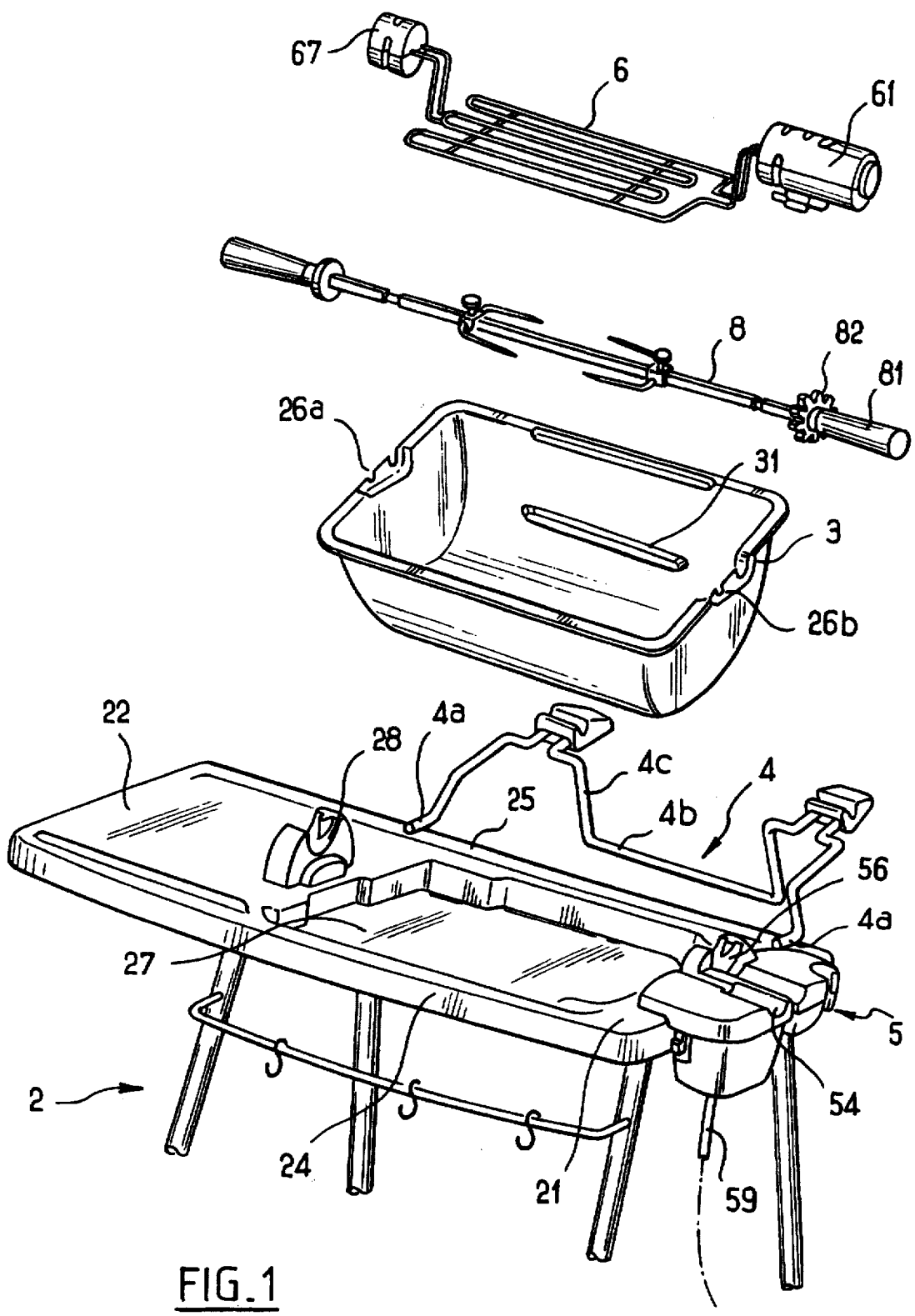
FIG. 1 is a diagrammatic exploded perspective view of the barbecue of the invention.

Referring to FIG. 1, an electric barbecue has a frame 2 and a removable kettle 3 that can be placed on the frame 2. The latter has a substantially rectangular platform delimited by two ends 21 and 22 and by two longitudinal sides 24 and 25.

This platform includes an opening 27 to accommodate the kettle 3.

Figure 7:
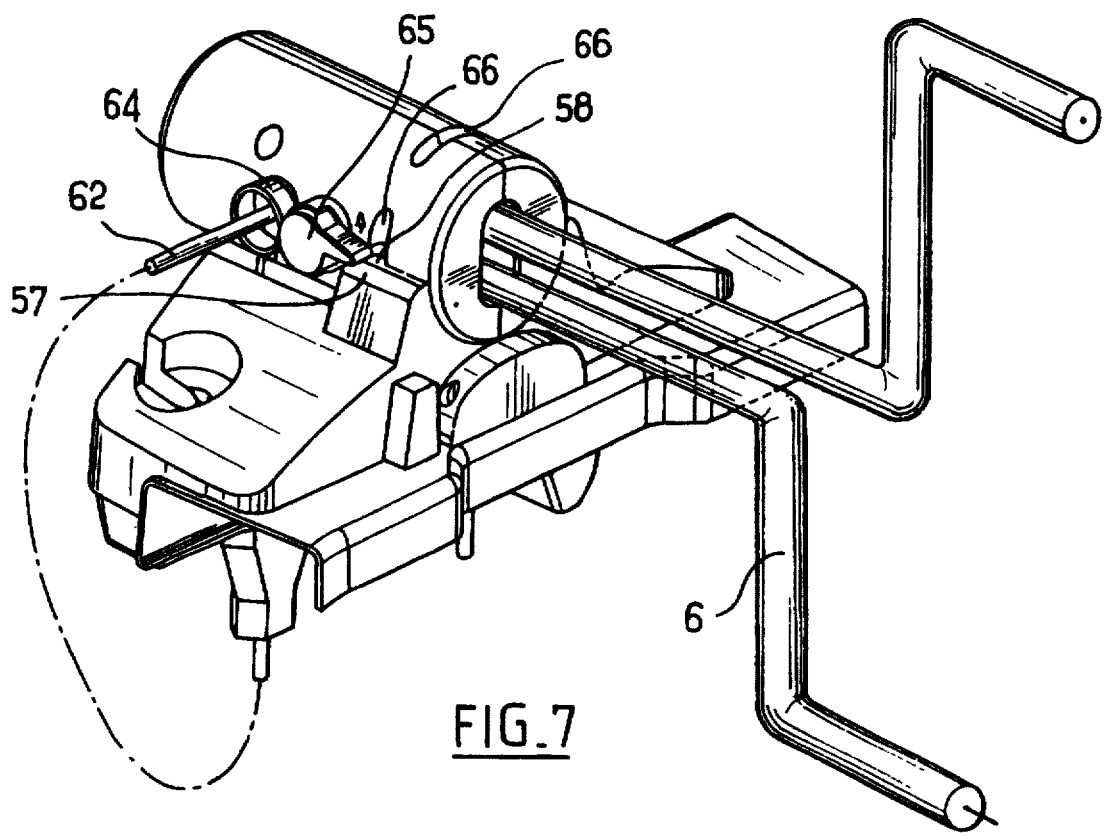
FIG. 7 is a perspective view similar to FIG. 6 with the heater means in a second position.

Tubular resistive electric heater elements 6 shown in FIG. 7 and a rotisserie spit 8 shown in FIG. 3 are also part of the barbecue.

In accordance with the invention, the spit 8 is rotated by an electric motor 52 housed in a unit 5 fixed to the frame.

In the event of accidental overloading or poor balancing of the spit 8, the motor 52 can be restarted in the opposite direction.

Drive means 51, 82 connect the motor 52 to the spit 8.

Figure 4:
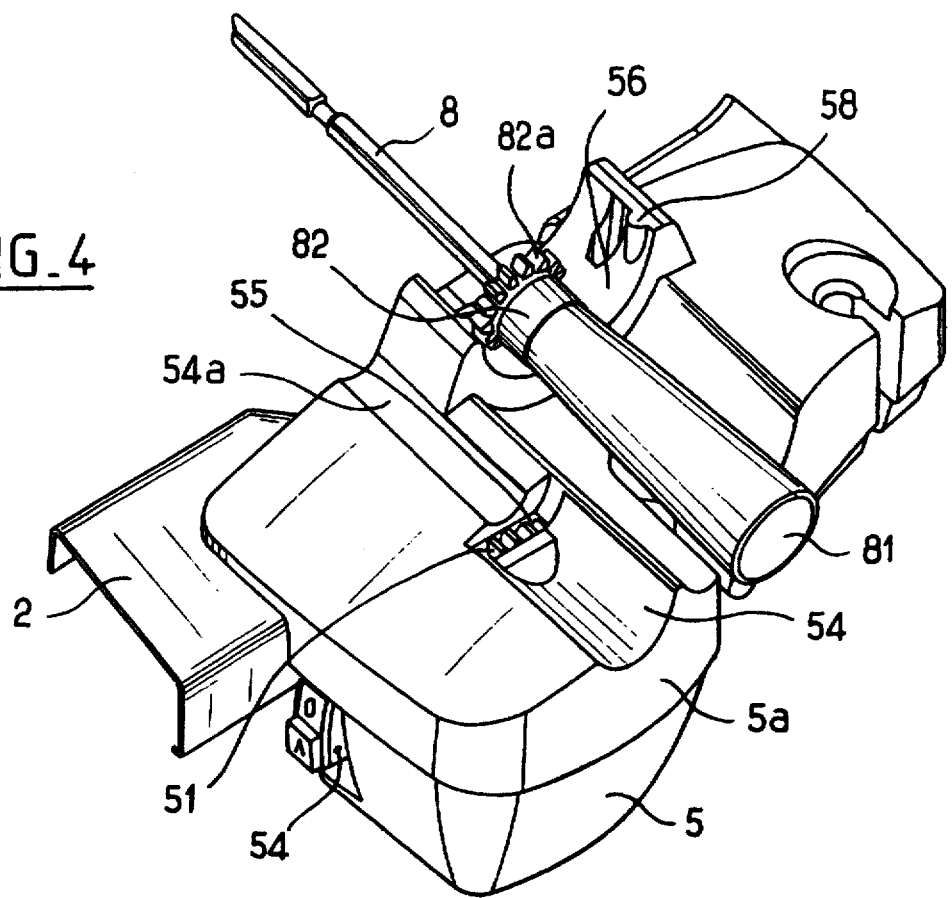
FIG. 4 is a perspective view of the rotisserie from FIG. 3.
Figure 5:
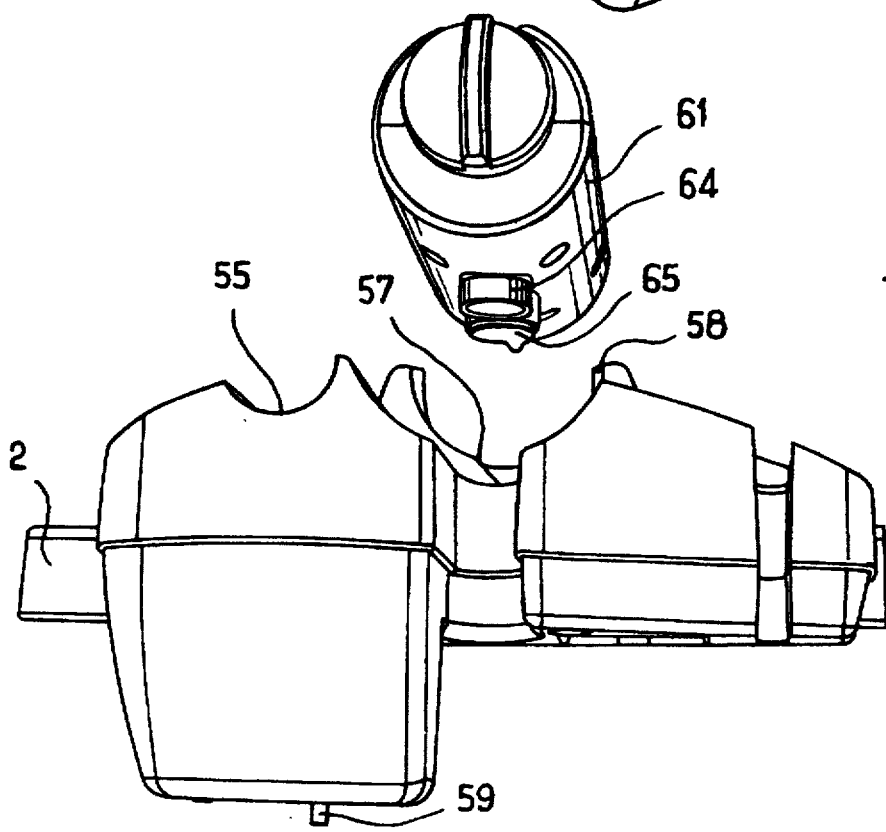
FIG. 5 is a perspective view showing the positioning of the heater means on a barbecue of the invention.

As shown in FIGS. 3 and 4, the spit 8 comprises drive means 82 adapted to inter-engage with complementary drive means 51 housed in the unit 5.

In this embodiment, the drive means comprise two toothed wheels 82, 51 that mesh with each other.

One wheel 51 is rotated by the motor 52 inside the unit 5. The latter has a window opening 55 through its top face 5a, in line with the toothed wheel 51.

The spit 8 has at one end a handle 81, generally attached in a non-removable way, and having a toothed wheel 82 at its periphery.

The unit 5 comprises on a top face 5a slightly above the platform of the frame 2 a recessed portion 54 adapted to house at least part of the handle 81 on the spit 8. The top face 5a forms a lid assembled to the unit 5 containing the motor 52 and the toothed wheel 51.

The toothed wheel 82 on the spit 8 is then in line with the toothed wheel 51 in the unit 5, which is in the window 55.

The recessed portion 54 is extended towards the kettle by a groove 54a designed to house the spit 8 projecting from the handle 81.

Bearings 26a and 26b are provided at each side of the kettle to support the spit 8 as it rotates. The spit has portions 85 of smaller cross-section that fit in the bearing 26a and 26b.

As shown in FIG. 3, the pointed end of the spit is protected by a second handle 83 that is removable to enable food to be placed on and removed from the spit 8.

The handle 83 may be equipped with a guard 84 protecting the user when placing it on the pointed end of the spit 8.

It is therefore a very simple matter to install the spit 8 on the barbecue: all that is required is to place it on the bearings 26a and 26b and the recessed part 54 of the unit, ensuring that the two toothed wheels 82, 51 line up.

A switch 53 operated by an on/off button 54 on the unit controls the supply of electrical power to the motor 52 and thus the rotation of the spit. A power supply cable 59 adapted to be connected to an external power source supplies power to the motor 52.

The unit 5 preferably comprises separate housings 52a, 51a for the motor 52 and for the toothed wheel 51. A single opening is provided through which the shaft of the motor 52 passes towards the center of the toothed wheel 51.

Accordingly, if liquid enters the unit via the window 55 it does not come into contact with the motor or the electrical power supply system. Holes may be provided in the bottom of the housing 51a for the toothed wheel 51 to enable this liquid to escape.

In operation, the spit 8 rests on the bearing 26a on the kettle 3 at the opposite end from the unit 5 and is guided by the bearing 26b on the kettle. The spit 8 also rests on the toothed wheel 51.

When the spit 8 is rotated, it abuts against one or other of the guide surfaces of the bearing 26b. Once abutted with these surfaces, the combination of the spit 8 and the handles 81 and 83 is rotated.

The tooth on the toothed wheel 82 enter far enough into the window 55 of the unit 5 to be supported by and to mesh with the toothed wheel 51.

Figure 6:
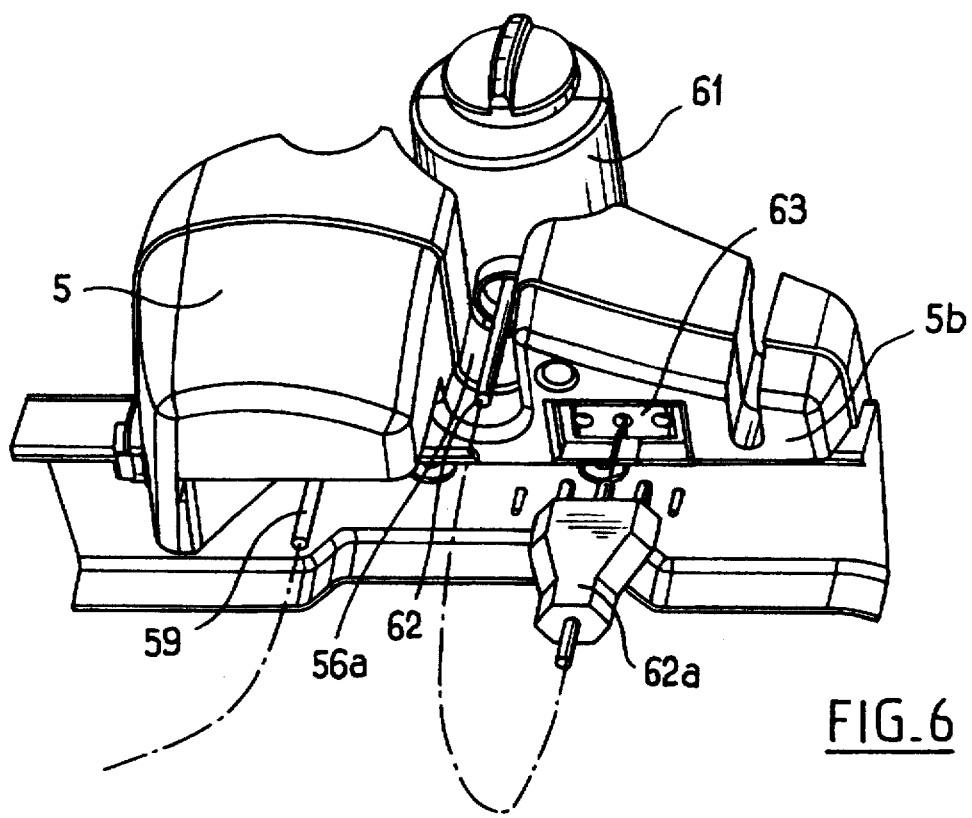
FIG. 6 is a perspective view similar to FIG. 5 showing the connection of the heater means in a first position.

As shown in FIG. 6, the unit 5 further comprises electrical connection means 63 adapted to supply electric power to the electric heater means 6.

The connections means 63, similar to a socket outlet, are supplied with power by the power supply cable 59.

The unit 5 has on its top face 5a a housing 56 adapted to receive a connection end 61 of the electric heater means 6.

In this example the housing 56 is substantially cylindrical in shape and the connection end 61 of the heater means 6 has a complementary cylindrical shape.

As clearly shown in FIG. 6, the electrical connection means 63 open onto the bottom face of the unit and are therefore protected from splashing with juice or food during cooking. The electric connection means 63 comprise a socket into which is inserted a plug 62a connected by an electric cable 62 to the connection end 61.

The heating means preferably comprise a tubular resistive electric heater element 6 extending substantially in a plane. The ends of the element 6 are electrically connected at the connection end 61. The latter pivots in the housing 56 of the unit 5 between at least two operating positions in which the plane containing the element 6 is respectively horizontal and vertical. These two positions are shown in FIG. 6 and FIG. 7, respectively. The connection end is pivoted 90° between these two positions.

A handle 67 is also fixed to the element 6, at the end opposite the connection end 61. The frame 2 incorporates a bearing 28 adapted to support the handle 67 at the end 22 opposite the end 21 supporting the unit 5.

The plane of the element being offset vertically relative to the axis of the connection end, two horizontal positions can be defined: a bottom position in which the element is under a cooking grill and a top position, the connection end being pivoted 180° between these two positions.

The connection end 61 includes an opening 64 through which the electric power supply cable 62 exits. In this example the opening 64 is in the cylindrical flank of the connection end 61. It could equally well be at the end of the latter.

The unit 5 preferably comprises a notch 56a aligned with the housing 56 for the power supply cable 62 from the connection end 61 to pass through.

The latter further includes safety members 65 movable between an "on" position and an "off" position in which the electrical power supply to the heater mean 6 is cut off, the housing 56 of the unit 5 comprising safety means 58 adapted to move the safety members 65 into said "on" position when the heater means 6 are disposed on the unit 5 in a normal operating position.

In a way that is known in itself, the safety members 65 may comprise a rotary cam spring-loaded into the "off" position.

The safety means comprise projections 57 adapted to displace the rotary cam against said spring-loading into the "on" position when the connection end 61 is placed in the housing 56 in a normal operating position.

In this example, the housing 56 has two projections 57 at 90° to each other, displacing the safety cam 65 when the element is vertical or horizontal.

To facilitate positioning the cylindrical connection end 61 in the cylindrical housing 56 and to hold the element 6 in place, notches 66 and complementary profiles 58 are respectively provided on the surface of the connection end and inside the housing 56.

Similar notches and profiles may also be provided on the handle 67 and the bearing 28 on the frame 2.

The connection end 61 comprises a series of notches 66 disposed in a circle at the periphery of the connection end 61. A series of straight notches could instead be provided on the peripheral surface. Positioning the connection end 61 on the unit 5 is therefore facilitated in the direction of the longitudinal axis of the connection end 61.

The unit 5 is removably mounted on the frame 2 of the barbecue 1. It can be clipped to the frame 2 at one end 21 of the latter, for example. It is preferably made of an insulative plastics material to prevent electric shock hazard. Additionally, the unit 5 protects the user against injury by the drive system.

The frame 2 includes a removable support 4 higher than the frame 2. One edge 32 of the kettle 3 rests on the support 4, the heater means 6 resting on the frame 2 and the unit 5 and the spit 8 on the unit 5 and the kettle 3 via the bearings 26a and 26b.

The kettle can therefore be inclined independently of the spit 8 and the element 6, to form a windshield. Thus the bearings 26a and 26b are substantially in line with the recessed portion 54 when the kettle 3 is inclined to support the spit 8. The support 4 rests on one side 25 of the frame 2 perpendicular to the ends 21.

It has two ends 4a respectively inserted in the unit 5 and in the bearing 28 on the frame 2 when the support 4 is fitted and a portion 4b, 4c extending above the frame and resting one longitudinal side 25 of the frame 2.

This portion 4b, 4c is substantially C-shaped, the core 4b of the C-shape resting on the frame 2 and the wings 4c extending substantially vertically above the frame 2.

The kettle 3 has on an inside face a shoulder 31 adapted to support a cooking grill 7. When the kettle 3 is resting on the support 4, the shoulder 31 projects in a horizontal plane including a second edge 33 of the kettle 3, opposite the edge 32 resting on the support 4.

In the horizontal position of the kettle 3 the cooking grill 7 therefore rests on the edges 32 and 33 of the latter; it is held horizontally on the shoulder 31 inside the kettle 3 even when the latter is inclined. The distance between the edge 32 and the shoulder 31 is substantially equal to the height to which the kettle 3 is raised above the frame 2, i.e. the length of the perpendicular wings 4c of the support 4.

Figure 2A:
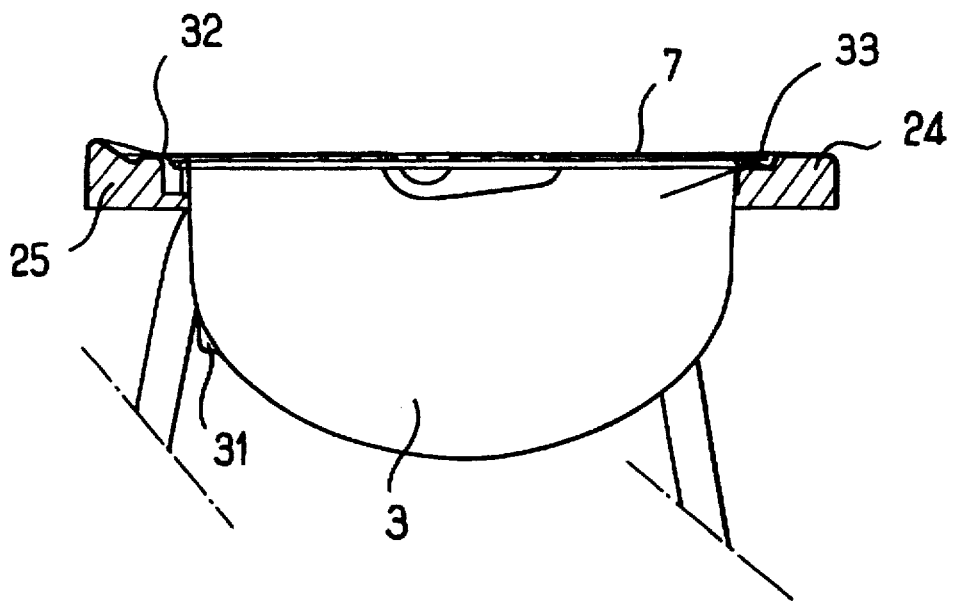
FIGS. 2A and 2B are cross-section views of the barbecue with a kettle respectively horizontal and inclined.
Figure 2B:
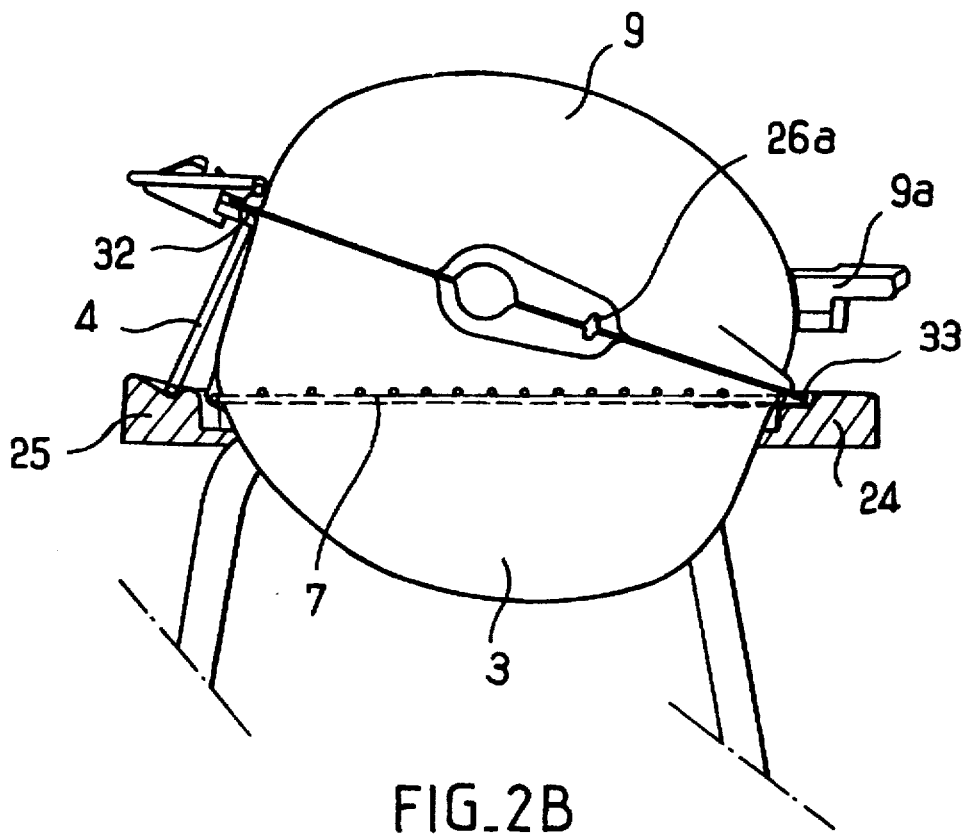

As shown in FIG. 2B, the kettle 3 can be covered by a lid 9. The lid 9 is pivotally fixed, for example by hinges, to the support 4 so that it can be removed when the kettle 3 is horizontal. The lid 9 has a handle 9a for manipulating it.

In the embodiment described hereinabove the barbecue has two main modes of operation: a rotisserie mode with the kettle 3 inclined, the spit 8 resting on the kettle 3 and the unit 5, the element 6 vertical and the lid on the hinges of the support 4, and a barbecue mode with the kettle 3 horizontal and the element horizontal above or below the cooking grill.

Of course, many modifications may be made to the embodiment described above without departing from the scope of the invention.

There is claimed:

1. An electric barbecue with rotisserie comprising a frame, a kettle placed on the frame, electric heater means, at least one spit rotated by an electric motor housed in a unit fixed to said frame and further comprising electric connection means adapted to supply electric power to said electric heater means, and a single power supply cable adapted to be connected to an external electric power supply and to supply power to said connection means and said motor, wherein said unit comprises on a top face a recessed portion adapted to accommodate removably a part of a handle fixed to one end of said spit, said recessed portion having an opening through it in line with drive means housed in said unit and said handle of said spit incorporating complementary drive means adapted to be inter-engaged with said drive means when said handle is housed in said recessed portion, and wherein said unit comprises on said top face a housing adapted to receive removably a connection end of said electric heater means.

2. The electric barbecue claimed in claim 1 wherein said electric connection means project from a bottom face of said unit and an electric cable is adapted to connect said connection end to said connection means.

3. The electric barbecue claimed in claim 1 wherein said heater means comprise a substantially plane resistive electric element, said connection end pivoting in said housing between at least two operating positions in which said plane is respectively horizontal and vertical.

4. The electric barbecue claimed in claim 1 wherein said connection end includes safety members movable between an on position and an off position in which the supply of electric power to said heater means is cut off, said housing on said unit comprising safety means adapted to displace said safety members into said on position when said heater means are placed on said unit in a normal operating position.

5. The electric barbecue claimed in claim 1 wherein said frame includes a removable support projecting above said frame, one edge of said kettle resting on said support, said heater means resting on said frame and said unit and said spit resting on said unit and said kettle.

6. The electric barbecue claimed in claim 5 wherein said kettle has on an interior face a shoulder adapted to support a cooking grill, said shoulder projecting, when said kettle is resting on said support, in a horizontal plane including a second edge of said kettle opposite said edge resting on said support.

7. The electric barbecue claimed in claim 5 wherein a lid adapted to cover said kettle is pivotally fixed to said support.

8. The electric barbecue claimed in claim 1 wherein said unit is made from an insulative plastics material.

9. The electric barbecue claimed in claim 1 wherein said unit is removably mounted on said frame.

10. The electric barbecue claimed in claim 5 wherein said unit is fixed to one end of said frame, said support resting on one side of said frame perpendicular to said end.

* * * * *